Sept. 12, 1967  B. A. RASMUSSEN  3,341,250
SAFETY BELT BUCKLE
Filed April 19, 1965  4 Sheets-Sheet 1
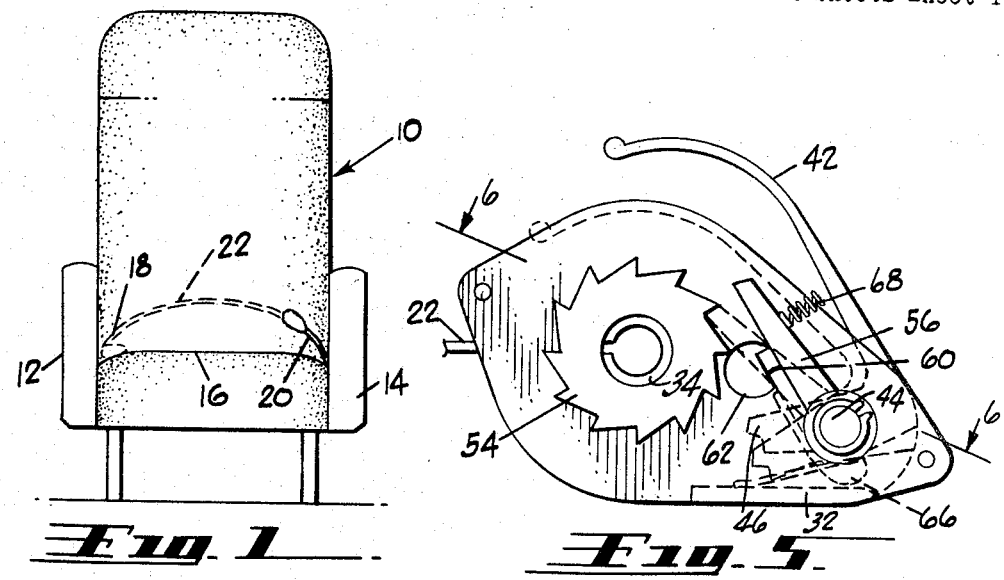
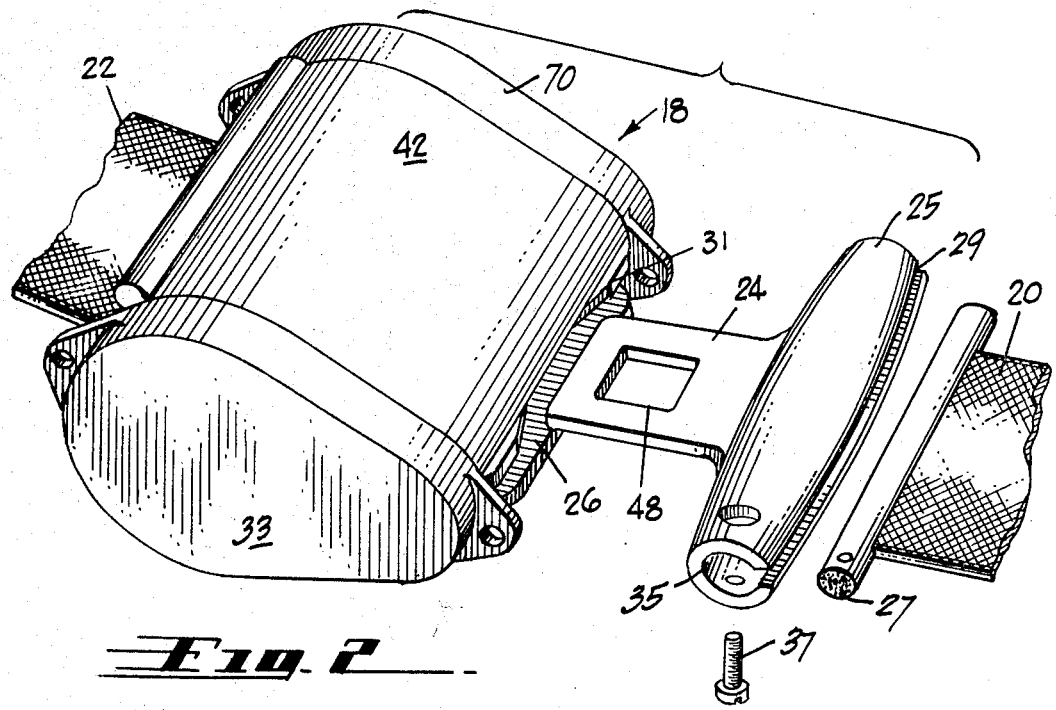
INVENTOR.
BORGE A. RASMUSSEN - DECEASED
BY HAZEL K. RASMUSSEN - WIDOW
By Robert Q. Richardson
ATTORNEY INVENTOR.
BORGE A. RASMUSSEN-DECEASED
BY HAZEL K. RASMUSSEN-WIDOW
By Robert O. Richardson
ATTORNEY.

Sept. 12, 1967  B. A. RASMUSSEN  3,341,250
SAFETY BELT BUCKLE
Filed April 19, 1965  4 Sheets-Sheet 4

INVENTOR.
BORGE A. RASMUSSEN-DECEASED
BY HAZEL K. RASMUSSEN-WIDOW
Robert O. Richardson
ATTORNEY.

United States Patent Office 3,341,250
Patented Sept. 12, 1967

3,341,250
SAFETY BELT BUCKLE
Borge A. Rasmussen, deceased, late of Santa Monica, Calif., by Hazel K. Rasmussen, widow, Santa Monica, Calif., assignor, by mesne assignments, to McDonnell Douglas Corporation, Santa Monica, Calif., a corporation of Maryland
Filed Apr. 19, 1965, Ser. No. 449,335
11 Claims. (Cl. 297—388)

This invention relates to a safety belt used to strap occupants of a moving vehicle in their seats, and more especially to the type wherein the belt is retracted out of the way of the occupant when not in use.

The conventional safety belt has two cooperating belt portions of approximately the same length. One end of each portion is securely anchored to the seat or floor structure of the vehicle, and the free ends are brought around the seat occupant and secured together by means of a buckle attached to one of the free ends. When not in use, the belt portions are left lying on the seat where they are subjected to dangling on the floor, and thus becoming trampled and soiled. Even when the belt portions are lying on the seat, they present an untidy appearance. Furthermore, they can be the source of annoyance and discomfort to an unwary sitter, especially one who sits on the buckle, as these buckles are considerably larger and bulkier than the usual clothing buckles in order to withstand the shock loads associated with a moving vehicle.

Various proposals have been made in the past for retraction of the safety belt when not in use. Many of these have involved retraction of the belt into the arm rest of the seat or into some kind of housing at the side or bottom of the seat. There also is available a device that clips onto the belt itself midway between its ends. This device causes the belt to roll into a double loop to shorten the overall distance between the ends.

The present invention departs from these arrangements, and contemplates a safety belt wherein the belt buckle itself is utilized as the retracting means as well as the securing means for the cooperative belt portions. Upon disengagement of the present buckle from the free end of the cooperative belt portion, the belt portion attached to the buckle is automatically reeled into the buckle, and the buckle is simultaneously withdrawn from the main sitting area of the seat into a corner or into a recess built into the arm rest. As the other belt portion of the present belt, hereinafter sometimes referred to as the cooperative belt portion, is relatively short in comparison with the portion attached to the buckle, it can be left lying on the seat or tucked away neatly in a corner without danger of falling on the floor. Thus, the safety belt of the present invention offers a compact, unobtrusive, and neat unit when not in use.

The automatic retraction feature of the buckle of the present invention also permits self-adjustment of the belt when strapped around the seat occupant, the belt retracting into the buckle to take up any slack which might have been made when the occupant first pulled the buckle out of the seat corner for engagement with the cooperative belt portion attached to the opposite side of the seat. Thus, once engaged, the occupant of the seat need not make any further adjustment of the belt length. At the same time, the retraction mechanism is designed so that there is no tightening of the belt around the seat occupant which might cause discomfort.

Also, once engaged, the present buckle utilizes metal to metal locking or detent means to prevent further extension or unwinding of the belt under shock loads, such as occur during rapid deceleration of the vehicle or during sudden loss of altitude in the case of aircraft. In conventional safety belts, the locking action is provided by some friction means, such as jaws, which work directly on one of the belt portions. Since these portions are generally made of a webbing material such as canvas or nylon, any grease or dirt on such material due to extended handling will tend to make them slick and cause slippage in the friction means. Such slippage is obviously detrimental to the protection afforded the belt wearer. The metal to metal locking means in the present buckle eliminates this slippage problem.

Tests under high impact conditions, when a safety belt is most sorely needed, show that most handles or levers in a car door or seat belt have been designed without consideration of the high impact danger. For example, most car door handles, or internal activating mechanisms, although they have a mass of only a few ounces, have enough inertia in high impact that the car doors automatically unlock and open when a crash occurs. Since most injuries result from this defect in design, the problem is serious. The problem is equally serious in the fastening of seat belts where it is desired that the belt remain fastened under high impact. The safety belt of the present invention avoids the high impact inertia actuation of the buckle by so arranging the moments of force and the pivot points about which they turn that this does not occur.

The now preferred embodiment of the novel safety belt and buckle of this invention is illustrated in the accompanying drawings by way of example, and will be described hereinafter in conjunction with these drawings in which:

FIG. 1 is a front view of an aircraft seat showing the buckle and the cooperative belt portion in a retracted position, lying in a corner of the sitting area, the dotted lines showing the travel of the buckle when brought across the lap of the seat occupant to engage with the cooperative belt portion attached to the opposite side of the seat;

FIG. 2 is a perspective view of the buckle and the engaging end or tip of the cooperative belt portion;

FIG. 3 is an exploded perspective view showing the aft and bottom portions of the buckle;

Figure 5:
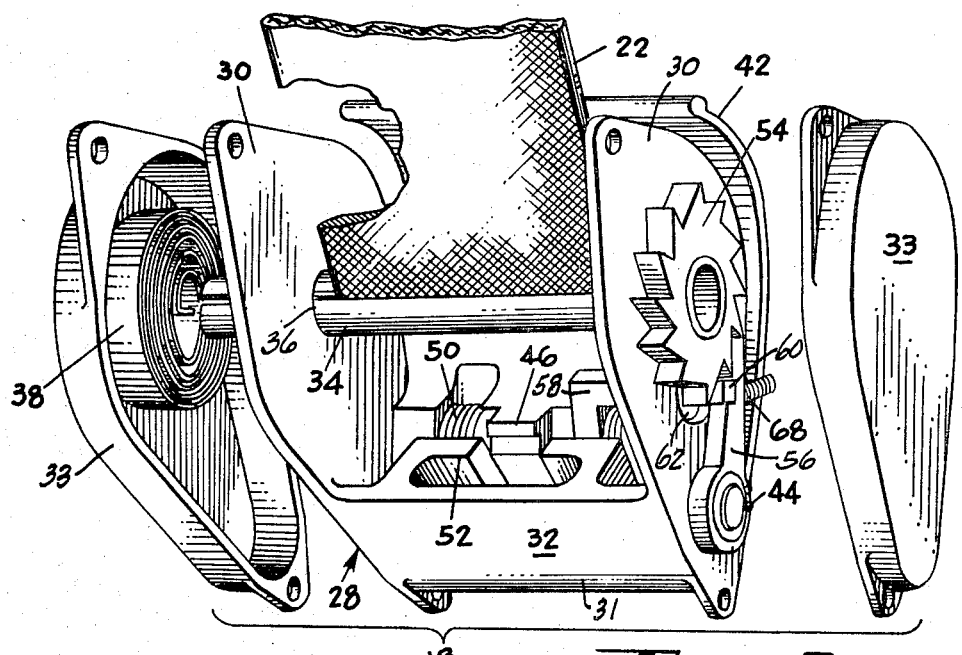
FIG. 5 is a side elevational view of the buckle with the cover plate removed and with the lever handle in release position.

Referring now to the drawings in more detail, FIG. 1 shows a typical passenger seat 10 in a commercial aircraft, with left and right arm rests 12, 14 and sitting area 16. Buckle 18 and the cooperative belt portion 20 of the present invention are shown in the retracted position, lying respectively in left and right rear corners of the sitting area 16. The other end (not shown) of each of the belt portions is securely anchored to the seat structure or floor by any conventional attaching means. In this retracted position, the buckle 18 and cooperative belt portion 20 are not in the way of the seat occupant when he sits down, and yet are conveniently accessible to him when he wishes to use the belt.

In wearing the belt, the seat occupant takes buckle 18 in hand and pulls it over his lower torso to meet cooperative belt portion 20, unwinding belt portion 22 attached to the buckle and rolled up within the buckle housing. The cooperating belt portions are made preferably of a nylon webbing with a herringbone weave pattern and has the necessary strength to withstand the 5,000 pound impact test required for safety approval. As shown in FIG. 2, the cooperative belt portion 20 is provided with a perforated metal tip or end 24 which is inserted into an opening 26 in the front of the buckle to engage with latching means in the buckle. Upon engagement, the automatic retraction feature of the buckle 18 will adjust the length of belt 22 so that the whole belt fits snugly and comfortably around the wearer.

Belt portion 20 is attached to metal tip 24 in a manner to make it as light and compact as possible. The free end of the belt is first frayed and then embedded in a cylindrical casting 27 made of epoxy resin. The casting extends beyond the width of the belt and has a diameter slightly less than the inside diameter of the tubular portion 25 of tip 24. The cylindrical casting 27 is then inserted into the opening 35 of the tubular portion 25 by sliding the adjacent belt portion into the slot 29. Screw 37 holds the casting 27 securely in place. While it is possible to make the casting 27 integral with tubular portion 25 by utilizing the portion as the mold and casting the resin directly into it, after insertion of the frayed belt end into the slot 29, the method first described is preferred since it permits replacement of the belt portion, should such replacement be necessary, without also replacing the tip 24.

Another method of attachment of the belt portion 20 to the tip or end 24 (not shown in drawings) would be to form a loop of the belt end and to stitch the loop together in a conventional manner. This loop, consisting of several thicknesses of the belt, would then be inserted into opening 35, as before. In this attachment method, the belt end is seared with a hot iron to prevent fraying of the nylon strands.

As shown in FIG. 3, the buckle 18 consists of a casing 28 having side walls 30, a forward wall 31, and a bottom wall 32 extending about half the length of the side walls. To make the casing as light as practicable, it is made of an aluminum alloy. Cover plates 33 fit over the side walls to enclose buckle component parts attached exteriorly of the side walls.

Figure 6:
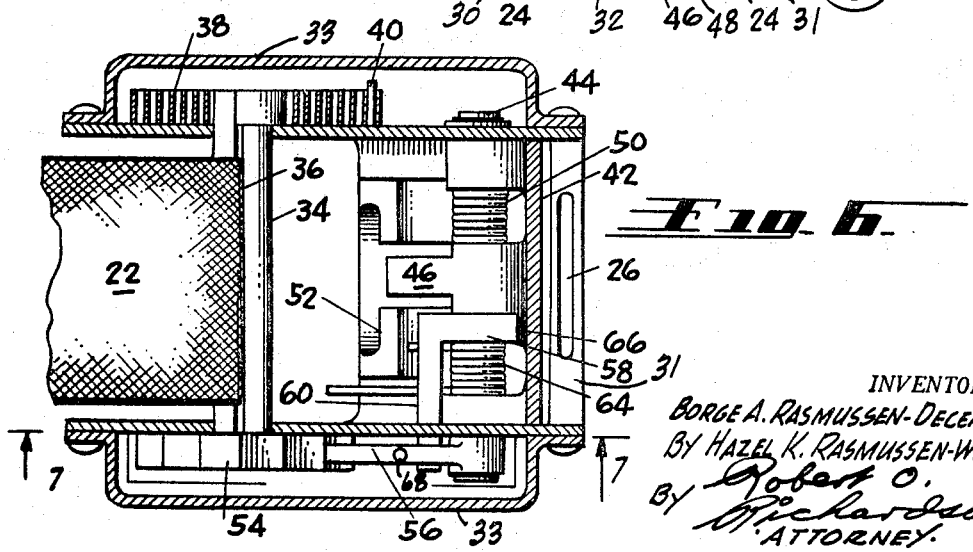
FIG. 6 is a sectional view of the buckle taken along the line 6—6 of FIG. 5.
Figure 4:
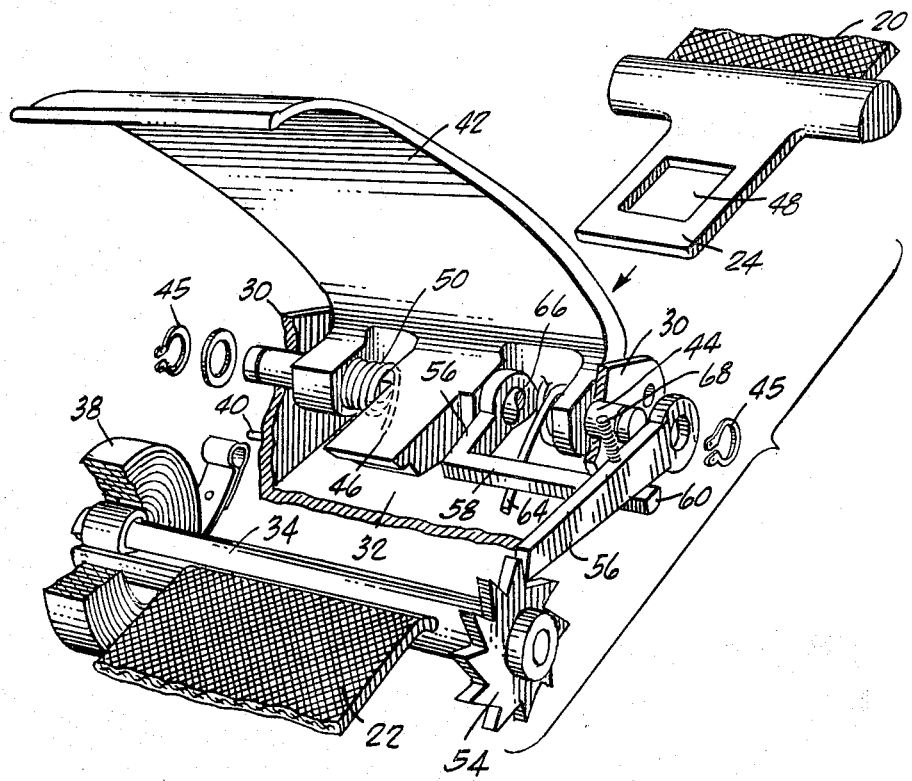
FIG. 4 is an exploded perspective view with parts broken away showing the relationship of the parts.

The automatic retraction and reeling feature is provided by a horizontal hollow shaft 34 pivotally mounted in the side walls 30 and extending beyond the side walls. A coil spring 38 is attached on one of the extended ends. Shaft 34 is slotted so as to permit insertion of belt portion 22 in the slot 36 for attachment to the shaft, preferably in the manner described in FIG. 2 with reference to attaching belt portion 20 to metal tip 24. The inside end of spring 38 is also hooked into the slot 36 and the outside end is attached to a pin 40 on the side wall, as shown in FIG. 6. On installation, spring 38 is tightly wound on shaft 34 so that its unwinding tendency causes shaft 34 to rotate, winding belt portion 22 on the shaft through an opening at the bottom and rear of the casing. The spring is again rewound when the buckle is pulled from it retracted position to engage with the cooperative belt portion. The tension in the spring is sufficient so that any slack put in the belt during engagement will be taken up automatically. At the same time, the tension in the spring is not so great as to cause discomfort to the wearer or to cause the buckle to snap back to its retracted position upon disengagement from the cooperative belt portion.

As shown in FIGS. 3 through 7 inclusive, the latching mechanism includes a release lever 42 pivotally mounted on a horizontal shaft 44 at the forward end of the buckle 18 and forming a closure for the buckle. Subtending the handle and resting on the bottom wall 32 is a dog 46 adapted to engage perforation 48 (FIG. 2) in the belt tip 24. The release lever is urged to the closed position by a torsion spring 50 also mounted on shaft 44. Upon insertion of belt tip 24 into opening 26, dog 46 is first urged upward by the leading edge of tip 24 and then, after clearing the leading edge, the dog 46 is urged downward by the action of spring 50 to engage with perforation 48 within tip 24. Guide groove 52 in bottom wall 32, shown in FIGS. 3 and 5, facilitates engagement of the dog 46 with the perforation 48. To release the belt tip, release lever 42 is lifted at its aft end, raising dog 46 off the bottom wall 32, as shown in FIG. 3, and out of engagement with the belt tip which is then withdrawn from the buckle. Once the lifting force is removed from the handle of release lever 42, the latter will again be brought back to the closed position by spring 50.

As shown in FIGS. 3 to 7, locking action to prevent further unwinding or extension of belt 22, once the buckle 18 is engaged with the cooperative belt portion 20, is accomplished by means of a ratchet wheel 54 on the other of the extended ends of shaft 34. A pawl 56, and a pawl-actuating lever 58 control the rotation of ratchet wheel 54. The pawl and lever are pivotally mounted on shaft 44 in cooperative relationship wherein an arm 60 of the lever 58 protrudes through a perforation 62 in the side wall and rests below the pawl. When the belt tip 24 is not engaged with the buckle 18, a torsion spring 64 is mounted on shaft 44 urging arm 60 upwardly, moving pawl 56 out of contact with ratchet 54.

Figure 7:
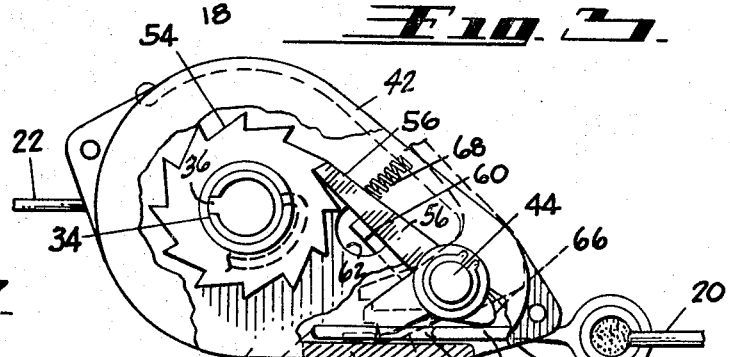
FIG. 7 is a side sectional view of the buckle taken along the line 7—7 of FIG. 6 with the cooperative belt end engaged in the buckle.

Lever 58 also has a dog 66 extending below shaft 44 and in the path of the belt tip 24. Upon insertion of the latter into the buckle, the dog 66 is lifted upward, forcing arm 60 downwardly and away from pawl 56. Spring 68 mounted on pawl 56 and pushing against the top surface of cover plate 33 now urges pawl 56 into contact with ratchet 54. Spring 68 is of necessity weaker than spring 64. When the pawl 56 is in contact with the ratchet wheel 54, further extension movement of belt 22 is prevented but the ratchet wheel 54 may rotate counterclockwise, as seen in FIG. 7, to take up any slack in belt 22. Upon removal of the belt tip 24, arm lever 60 is again urged upwardly by spring 64, moving pawl 56 out of contact with ratchet 54, and thus permitting free movement of belt 22, as previously described.

As will be apparent from FIG. 7, the primary shock load on belt portion 22 passes directly into shaft 34 and then is distributed to the side walls 30 of the casing 28. The load on belt portion 20 is transmitted directly to shaft 44 through tip 24 and dog 46. This load on shaft 44 is thence distributed to the side walls 30. With the shock loads being taken directly on the two shafts, which are made of steel, this loading pattern minimizes the number of highly stressed areas so as to effectively withstand the shock loads present during deceleration and other sudden changes of position of the vehicle.

Tests conducted on the buckle 18 have shown that it meets the applicable governmental specification for safety belts in commercial aircraft. With the buckle positioned horizontally as shown in FIG. 1, there are no moments of force about any pivot point that would cause the buckle to become unlatched when subjected to a high impact. The same is true when the buckle is in a vertical position, as when the belt is around the seat occupant's abdomen.

The ratchet type safety belt just described is assembled in the following manner:

The cylindrical end of the belt 22 is placed between the side walls 30 of case 28 and shaft 34 is passed through the opening in one of the side walls, over the cylindrical end of the belt 22, through the other flange hole of the other side wall 30 and into the center of the clock spring 38. With the belt 22 held in the fully unwound position, the clock spring 38 is wound up until it is fully loaded and the outer end of the spring is hooked over the spring pin 40. The belt assembly should then retract into the casing 28, wrapping itself around the cylinder of the shaft 34.

Pin 44 is passed through pawl 56, casing wall 30, latch 42, spring 64 (in loaded position), lever 58, latch 42, latch spring 50 (in loaded position), a second ear of latch 42, the other side of wall 30 and is secured with a retaining ring 45.

Spring cover plate 33 is placed over the clock spring 38 and secured with cover screws at each end. Spring 68 is set in a depression in pawl 56 and cover plate 33 is placed over the pawl 56 and the end of shaft 44. Cover plate 33 is then secured with cover screws in two places. The ratchet-lock safety belt assembly may be attached to the passenger seat or the vehicle structure in the same manner as standard safety belts.

To fasten the belt, the metal tip 24 of the belt assembly is passed through the guide slot 26 in the buckle casing 28 until the mechanism clicks and locks the two belt segments 20 and 22 together. To unfasten the belt, the latch 42 is simply lifted away from the casing 28. This permits the belt portion 20 to be withdrawn from the safety buckle 18.

Figure 8:
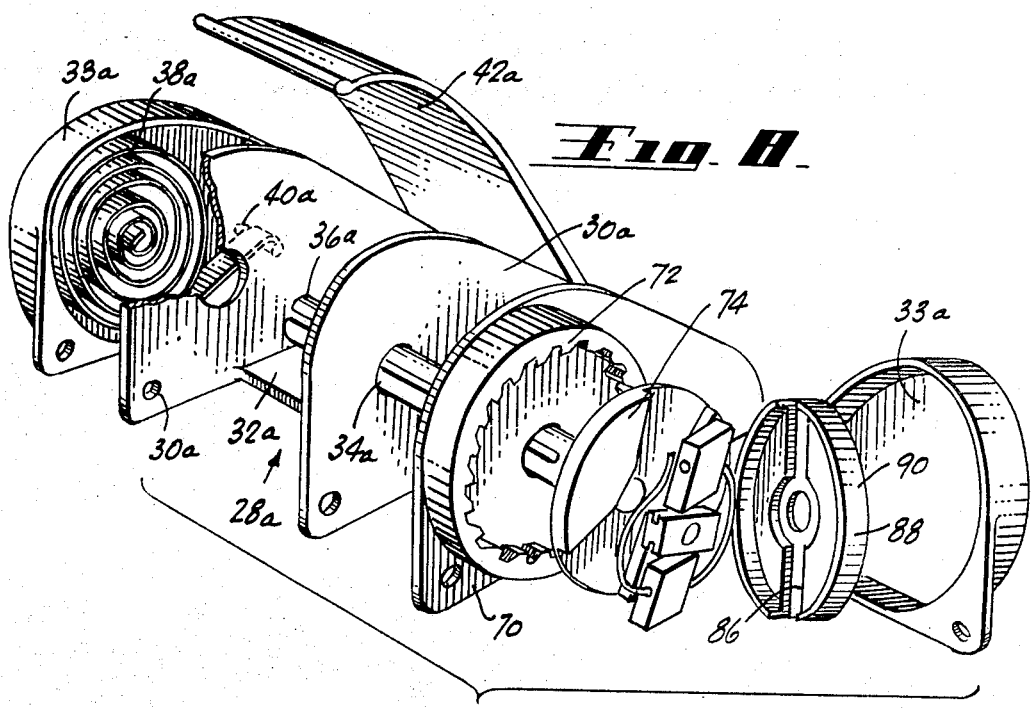
FIG. 8 is an exploded view of a modification.

Reference is now made to the modification shown in FIG. 8 which operates in such a manner as to permit free movement of the passenger while seated and yet insure full and instantaneous restraint in the event of abrupt impact or sudden deceleration of the vehicle. For convenience, like parts have like numbers followed by a small "a" to designate that these parts are interchangeable with like parts in the structure shown in FIGS. 1 to 7. For example, casing 28a includes side walls 30a, bottom wall 32a and a front wall (not shown), all being similar to the casing 28 in FIGS. 1 through 7. A cylindrical shaft 34a with slot 36a is used to receive the end of belt portion 22 and spring 38a is used to wind the belt around the shaft 34a. Latch release 42a is used to unfasten the two belt portions and covers 33a are positioned at both ends to protect the inner working parts and to give the buckle a nice finished appearance.

The inertia lock, which differs from the ratchet lock previously described, includes a ring gear plate 70, having a ring gear of teeth 72. A guide plate 74 is of a diameter to be received within the ring gear 76 inwardly from the gear teeth 72. This gear plate 74 is an integral part of shaft 34a, it being rigidly affixed thereto, such as by bonding or welding in a conventional manner. Hence, rotation of shaft 34a causes rotation of the guide plate 74. Guide plate 74 has opposing recesses in the outer surface so as to provide radially directed abutting walls 78 and 80, between which locking dogs 82, 84 may move. These locking dogs are of trapezoid shape and have a thickness greater than the depth of the recess in the guide plate so as to protrude outwardly to be received in and guided by a channel guide 86 extending radially across guide cover 88. This guide cover 88 is freely rotatable within ring gear cover 33a with its peripheral rim 90 fitting between teeth 72 and the periphery of guide plate 74.

Figures 9, 10:
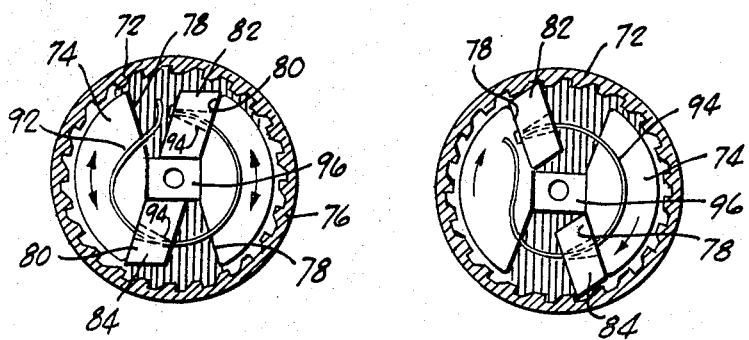
FIGS. 9 and 10 are end views showing how the modification in FIG. 8 reacts to relatively slow and relatively fast movement of belt unwinding.

Reference is now made to the illustrations in FIGS. 9 and 10. Here, guide cover 88 is removed to better illustrate the movement of the parts. Guide plate 74 is shown within the gear ring 76 with dogs 82 and 84 within the recessed area between walls 80 and 78. Spring 92 is inserted through conical openings 94 in dogs 82 and 84 to retain their inner surfaces in abutment with cam block 96 which has been centrally positioned at the axis of rotation of guide plate 74. As shown in FIG. 9, as the guide plate 74 rotates slowly in either direction, dogs 82 and 84 remain in abutment with walls 80 of guide plate 74 due to the tension of spring 92. This permits shaft 34a, upon which the safety belt is wound, to rotate in either direction as the passenger leans forward or moves slowly about. A sudden movement however, by the passenger, will cause shaft 34a to rotate with suddenness, and will cause an abrupt locking of the dogs with the ring gear teeth, as will be explained with reference to FIG. 10. In this view the guide plate 74 is shown after having been suddenly accelerated in the direction of the arrows shown, and the mass of dogs 82, 84 have been unable to rotate with the same degree of acceleration. The mass of these dogs are in opposition to the tension of spring 92 and thus fall back against walls 78. Because of the trapezoidal shape of dogs 82, 84, they have a longer radial length in this position than in the position shown in FIG. 9, and thus have an outward projecting portion which engages tape 72. This engagement stops the rotation of guide plate 74 and hence shaft 34a, to thus prevent further unwinding of the belt. The tension of the spring is so adjusted, in accordance with the mass of the dogs 82 and 84 to permit them to respond in this manner at a predetermined rotational acceleration. The manufacturer of this device may preselect a desired tension on spring 92 to meet his desired standard of performance.

Since the assembly of the embodiment shown in FIGS. 1 through 7 have been explained and because of the similarity of the embodiment shown in FIGS. 8, 9 and 10, such an assembly description of this embodiment is not deemed necessary, other than to point out that ring gear plate 70 is fastened to one of the casing side walls 30a. The guide plate 74 with the shaft 34a attached is then inserted therethrough, after which the cam block 96 and dogs 82, 84 are positioned. Guide cover 88 is then placed thereover. The final operation, of course, is the attachment of ring gear cover 33a.

It will be apparent to those skilled in the art that various changes and modifications may be made in the construction disclosed herein without departing from the spirit of the invention, and all such changes and modifications are intended to be embraced within the scope of the following claims.

What is claimed is:

1. A safety belt for securing an occupant in a moving vehicle, including:
   a belt buckle casing having a rotatable shaft;
   two belt portions having ends secured to said vehicle, one of said belt portions having a metallic tip with an opening therein for retention within said casing upon fastening thereof, the other of said belt portions having an end connected for rotation about said shaft;
   spring means in said belt buckle for normally urging said belt into rolled condition on said shaft;
   the shaft upon which said belt is wound normally being freely rotatable in either direction; and
   means on said casing actuable to prevent rotation of said shaft in a direction to permit said belt to be unrolled from said shaft.

2. A safety belt for securing an occupant in a moving vehicle, including:
   a belt buckle casing having a rotatable shaft;
   two belt portions having ends secured to said vehicle, one of said belt portions having a metallic tip with an opening therein for retention within said casing upon fastening thereof, the other of said belt portions having an end connected for rotation about said shaft;
   spring means in said belt buckle for normally urging said belt into rolled condition on said shaft;
   the shaft upon which said belt is wound normally being freely rotatable in either direction except when said buckle is in operative engagement with said tip; and
   means on said casing actuable by said belt tip to prevent rotation of said shaft in a direction to thereby prevent said belt being unwound from said shaft, yet permitting rotation of said shaft for the unwinding of said belt upon release of said belt tip from said belt buckle.

3. A safety belt for securing an occupant in a moving vehicle, including:
   a belt buckle comprising a casing having a pair of walls;
   a rotatable belt rolling shaft mounted between said walls, said shaft having a ratchet wheel mounted thereon;
   a pawl mounted on said casing for engagement with said ratchet wheel to permit wind-up movement only of said shaft, said belt being adapted for winding and unwinding within said buckle when said pawl is removed from said ratchet wheel;

means for engaging said pawl with said ratchet wheel upon engagement of said belt buckle with the tip of a belt portion to be engaged therewith, and means on said belt buckle for removing said pawl from engagement wtih said ratchet wheel upon disengagement of said buckle with said belt tip.

4. A safety belt for securing an occupant in a moving vehicle, including:
  a belt buckle having a rotatable shaft therein adapted for rolling a belt portion thereon;
  a belt tip adapted for engagement with said buckle in securing an occupant to a seat;
  a ratchet wheel affixed to and rotatable wtih said rotatable shaft;
  said buckle having a housing with a pawl mounted thereon;
  said pawl being adatped to engage said ratchet wheel to thereby limit rotation of said shaft only in a direction to roll up said belt on said shaft;
  means for disengaging said pawl from said ratchet wheel thereby to permit rotation of said shaft in either direction;
  means engaging said pawl to said ratchet wheel when said belt tip is engaged with said belt buckle, and
  means releasing said pawl from engagement with said ratchet wheel upon disengagement of said belt tip with said belt buckle.

5. A safety belt for securing an occupant in a moving vehicle, comprising:
  a belt buckle having a rotatable shaft;
  a first belt portion having a buckle-engaging tip;
  a second belt portion adapted to be rolled upon said shaft;
  a ratchet wheel affixed to said shaft;
  a pawl pivotally mounted within said buckle for engagement with said ratchet wheel upon engagement of said belt tip with said buckle;
  means on said belt buckle for releasing said tip from engagement with said buckle, and
  means for disengaging said pawl from said ratchet wheel upon said disengagement of said belt tip from said belt buckle.

6. A safety belt for securing an occupant in a moving vehicle including:
  a belt having two portions;
  a casing;
  roller means rotatably mounted in said casing for rolling up a first belt portion thereon;
  spring means for rotatably urging said roller means in a direction for rolling up said belt;
  ratchet wheel means mounted on said roller;
  slot means on said roller means for receiving a belt buckle engaging end of a belt portion;
  release lever means pivotally mounted in said casing, said lever including a belt tip engaging end and a handle end;
  spring means for urging said lever means in a direction which holds said belt tip engaging end of said lever in engagement with a belt buckle engaging end of the other of said belt portions;
  pawl means pivotally mounted on said casing for engaging said ratchet wheel to prevent rotation in a direction which unwinds said belt portion from said roller means;
  means causing engagement of said pawl means with said ratchet wheel when said belt tip engaging end of said lever is in engagement with said belt buckle engaging end of the other of said belt portions, and
  means disengaging said pawl means from said ratchet wheel when said belt tip engaging end is not engaged with said belt buckle engaging end.

7. A safety belt for securing an occupant in a moving vehicle including:
  a buckle having a casing, said casing having a side wall, a forward wall and a bottom wall, said bottom wall extending about half the length of said side walls; said side walls having perforations;
  cover plates for encasing buckle components;
  a hollow shaft pivotally mounted in said perforations and extending beyond said side walls, said shaft having a slot wherein to receive said belt for attachment;
  a coil spring attached on one end of said shaft, said spring being tightly wound on said shaft for winding said belt;
  a cooperative belt portion comprising:
    a metal tip, said tip having a tubular portion, said metal tip having a perforation;
    a plastic cylinder cast in said tubular portion of said metal tip;
    holding means disposed in said tubular portion for holding said cylinder within said tubular portion;
  a latching mechanism including:
    a release lever pivotally mounted on said shaft for forming a closure for said buckle;
    holding means adapted to engage said metal tip of said cooperative belt portion;
    a release lever for receiving a lifting force from said handle to release said holding means out of engagement with said belt tip to permit its withdrawal from said buckle;
    a ratchet wheel to prevent unwinding of said belt when said belt buckle is engaged with said cooperative belt portion;
    a pawl pivotally mounted on said shaft;
    a pawl-actuating-lever pivotally mounted on said shaft;
    an arm on said lever extending through said perforation in said side wall;
    a torsion spring mounted on said shaft for urging said arm upwardly, moving said pawl out of contact with said ratchet when said belt tip is not engaged with said buckle;
    a dog formed on said lever extending below said shaft and in the path of said belt tip, said dog being operable by said tip to move said lever from contact with said pawl, to thereby permit pawl engagement with said ratchet wheel when said belt tip engages said buckle.

8. A safety belt buckle for securing an occupant in a moving vehicle, said belt buckle having a rotatable shaft thereon for winding up said belt;
  said buckle having an inertia reel mechanism thereon for locking said shaft in non-rotating position when subjected to sudden acceleration; and
  spring means for unlocking said inertia reel mechanism to permit rotation of said shaft in either direction when not subjected to sudden acceleration.

9. The safety belt buckle as described in claim 8 wherein said inertia reel mechanism comprises:
  a ring gear plate having teeth thereon;
  a guide plate, secured to said rotatable shaft and rotatable therewith, said guide plate having radial recesses therein for receiving locking dogs;
  a cam block centrally mounted within said guide plate, said block having locking dogs positioned on opposite sides thereof and spring urged into predetermined position out of engagement with said teeth during normal rotation of said shaft, said locking dogs being adapted to engage said teeth upon sudden acceleration of said guide plate to thereby lock said shaft against rotational movement.

10. A safety belt buckle as defined in claim 9, wherein said dogs are of trapezoidal configuration and wherein sudden acceleration of said guide plate causes radial elongation of said dogs to thereby engage said dogs with said teeth.

11. A safety belt buckle as defined in claim 10 including a guide cover adapted to fit over said dogs and around said guide plate, said guide cover having channels radially extending therethrough to receive said dogs and guide them in their movement from one position to the other.

References Cited

UNITED STATES PATENTS

| | | | |
|---|---|---|---|
| 2,822,895 | 2/1958 | Ruhl | 24—170 |
| 2,979,282 | 4/1961 | Barecki | 297—388 X |
| 3,074,761 | 1/1963 | Ryan | 297—388 |
| 3,138,405 | 6/1964 | Hanway | 297—386 |
| 3,227,489 | 1/1966 | Stubblefield | 297—388 |
| 3,231,307 | 1/1966 | Smith | 297—388 |
| 3,233,296 | 2/1966 | Whittingham | 297—388 |
| 3,246,929 | 4/1966 | Taggart | 297—388 |
| 3,266,842 | 8/1966 | Board et al. | 297—388 |

FOREIGN PATENTS 1,179,105   12/1958   France.

DAVID J. WILLIAMOWSKY, *Primary Examiner.*
JAMES T. McCALL, *Examiner.*